United States Patent [19]

Beaudet

[11] Patent Number: 4,819,013

[45] Date of Patent: Apr. 4, 1989

[54] ION GENERATION COMPENSATION

[75] Inventor: Leo A. Beaudet, Milford, Mass.

[73] Assignee: Dennison Manufacturing Company, Framingham, Mass.

[21] Appl. No.: 922,496

[22] Filed: Oct. 23, 1986

[51] Int. Cl.[4] .............................................. G01D 15/06

[52] U.S. Cl. .................................... 346/159; 346/154; 346/155

[58] Field of Search ............... 346/159, 158, 154, 155; 358/298, 300, 77, 287; 101/DIG. 13; 400/119

[56] References Cited

U.S. PATENT DOCUMENTS

| | | | |
|---|---|---|---|
| 4,435,066 | 3/1984 | Takumi et al. | 346/159 |
| 4,495,508 | 1/1985 | Tarumi et al. | 346/159 |
| 4,626,876 | 12/1986 | Miyagawa et al. | 346/159 |

*Primary Examiner*—Arthur G. Evans
*Attorney, Agent, or Firm*—Arthur B. Moore; George E. Kersey

[57] ABSTRACT

An ion generation system employed in forming electrostatic images on a dielectric surface in which compensation is made for variations in the electrostatic images. The desired compensation is accomplished by spacial or electrical adjustments of electrode apertures, or by adjusting their relation to the dielectric cylinder, so that more uniform electrostatic images are produced.

18 Claims, 9 Drawing Sheets

HOLE CHART

| SYMBOL | DESCRIPTION | QTY |
|---|---|---|
| A | 0.0065 | 6 |
| B | 0.0066 | 4 |
| C | 0.0068 | 4 |
| D | 0.0070 | 2 |
| E | 0.0071 | 2 |
| F | 0.0072 | 2 |

ION GENERATION COMPENSATION

BACKGROUND OF THE INVENTION

This invention relates to ion generation, and more particularly, to the compensation for stroke width variations in ion generation imaging.

There are a number of techniques for generating ions to form electrostatic images. These include air gap breakdown, corona discharges, and spark discharges.

Particularly suitable for electrostatic imaging is a device disclosed in Fotland et al. U.S. Pat. 4,155,093. This patent discloses an ion generating device with a solid dielectric member contacted on opposite sides by two electrodes. One of the electrodes contains apertures or edge surfaces, located opposite the other electrode. A varying high voltage applied between the two electrodes generates a pool of positive and negative ions in the apertures. These ions may be extracted by a potential applied between the apertured electrode and a counterelectrode. This apparatus is suitable for electrostatic imaging in that apertures may be configured in a desired shape to create an electrostatic image of corresponding shape. A multiplexible imaging device may be created by patterning an array of opposing electrodes in the matrix crossover arrangement disclosed in Fotland et al. U.S. Pat. 4,267,556. Ions are extracted to form a latent electrostatic pattern of images on an adjacent dielectric member, normally consisting of discrete dots. These discrete images or dots overlap to form particular letters, characters, or symbols. A lesser constant potential may be applied to a third electrode, known disclosed in Carrish U.S. Pat. 4,160,257. The screen electrode is used to counteract the tendency of an electrostatic image of given polarity to attract oppositely charged ions from the discharge aperture when the direct current potential is removed between the control electrode and the conducting sublayer. It was found that the screen electrode provides control over image size by varying the size of the screen aperture, or by varying the voltage applied to the screen electrode, or by varying the distance between the screen electrode aperture and the dielectric cylinder. A reduction in the screen aperture size, for without any compromise in the image charge. This control over image size did not resolve the problem of variations in image size between two or more adjacent images. The failure to independently control individual image size has limited the printing capability of the system.

The stroke width, or the width of the printed image created by the electrostatic discharge from the cartridge, must fall within a certain range of values in order to obtain the desired visual qualities. As the human eye is sensitive to abrupt changes in stroke width, such changes will detract from the visual uniformity and sharpness necessary for many printing applications. The geometry of, or the potential applied to, each aperture of the screen electrode can be varied to compensate for any known change in stroke width. Such changes in stroke width can occur in several ways, for example, realignment of the cartridge with respect to the cylinder. The present invention is designed to compensate for stroke width variations resulting from changes in the distance between the discharge electrode and the dielectric surface on which ions are deposited over the areal extent of the array of electrodes. In practice it was found that this change in distance, caused by the cylindrical shape of the dielectric cylinder and/or reorientation of the cartridge with respect to the cylinder, was the source of these fringe effects. Such reoreintation or skewing of the cartridge is necessary to adjust for the realignment of the printed image caused by the skewing of the image and transfer cylinders. As disclosed in Ser. No. 180,218, the skewing of these cylinders is used to increase the toner transfer efficiency.

Accordingly, it is the principal object of the invention to maintain control over the individual size of electrostatic images generated on the dielectric receptive surface.

A further object of the invention is to enhance the print quality by maintaining uniformly sized electrostatic images that are generated on the dielectric receptive surface.

SUMMARY OF THE INVENTION

The above and related objects are achieved by adjusting the size, or the voltage, or the distance to the dielectric material, of each aperture in the array of electrode apertures. The problem of stroke width variation arises where the distance between the cartridge and the dielectric material increases because of the curved surface of the dielectric opposite the screen electrode, or due to some reorientation of the cartridge with respect to the dielectric material. The number of ions transported between the cartridge and the dielectric material decreases as this distance increases. One embodiment of the invention increases the size of the individual apertures to offset any increase in the cartridge-dielectric distance so that a greater number of ions are transported to the dielectric surface thereby maintaining the necessary stroke width. The extent to which it is necessary to increase aperture size laterally across the array of electrodes may be determined by experimental means.

A second embodiment of the invention increases or decreases the number of ions transported through an aperture so as to maintain uniform stroke width by varying the potential applied at the aperture. As a result different apertures will have different potentials applied depending on their distance from the dielectric material.

A third embodiment of the invention consists of altering the flat surface of the cartridge opposite the dielectric material so that the distance between the electrodes and the dielectric member does not vary between adjacent electrode apertures. This results in a curved array of electrodes whose apertures are equidistant from the electrostatic images on the dielectric member which each aperture produces in conjunction with the ion generator.

A fourth embodiment of the invention involves the use of a flat dielectric member on which the electrostatic images are generated.

DETAILED DESCRIPTION

Figure 1:
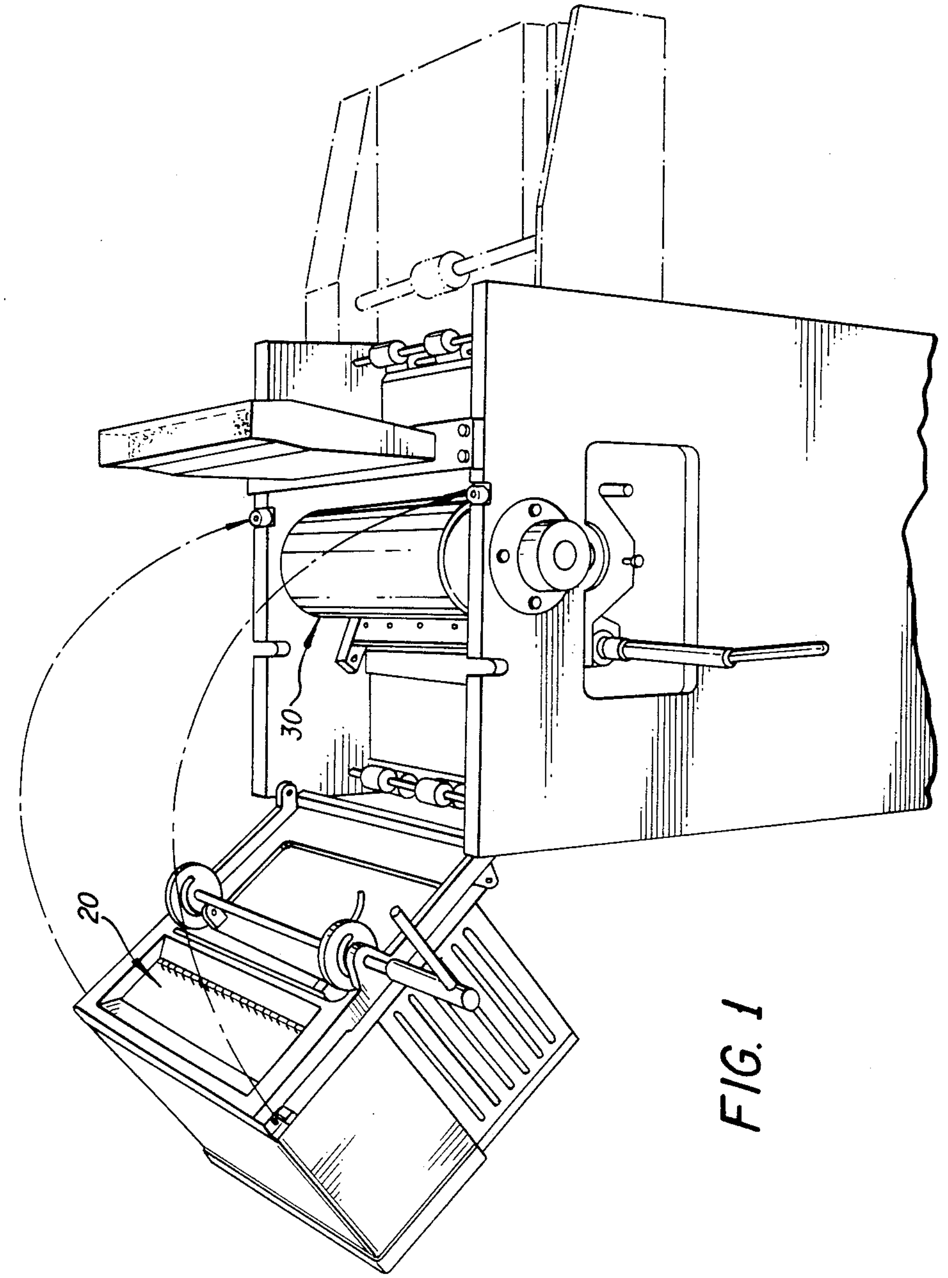
FIG. 1 is a perspective view of the printing apparatus with the ion cartridge exposed to illustrate the relationship to the underlying dielectric cylinder.
Figure 2:
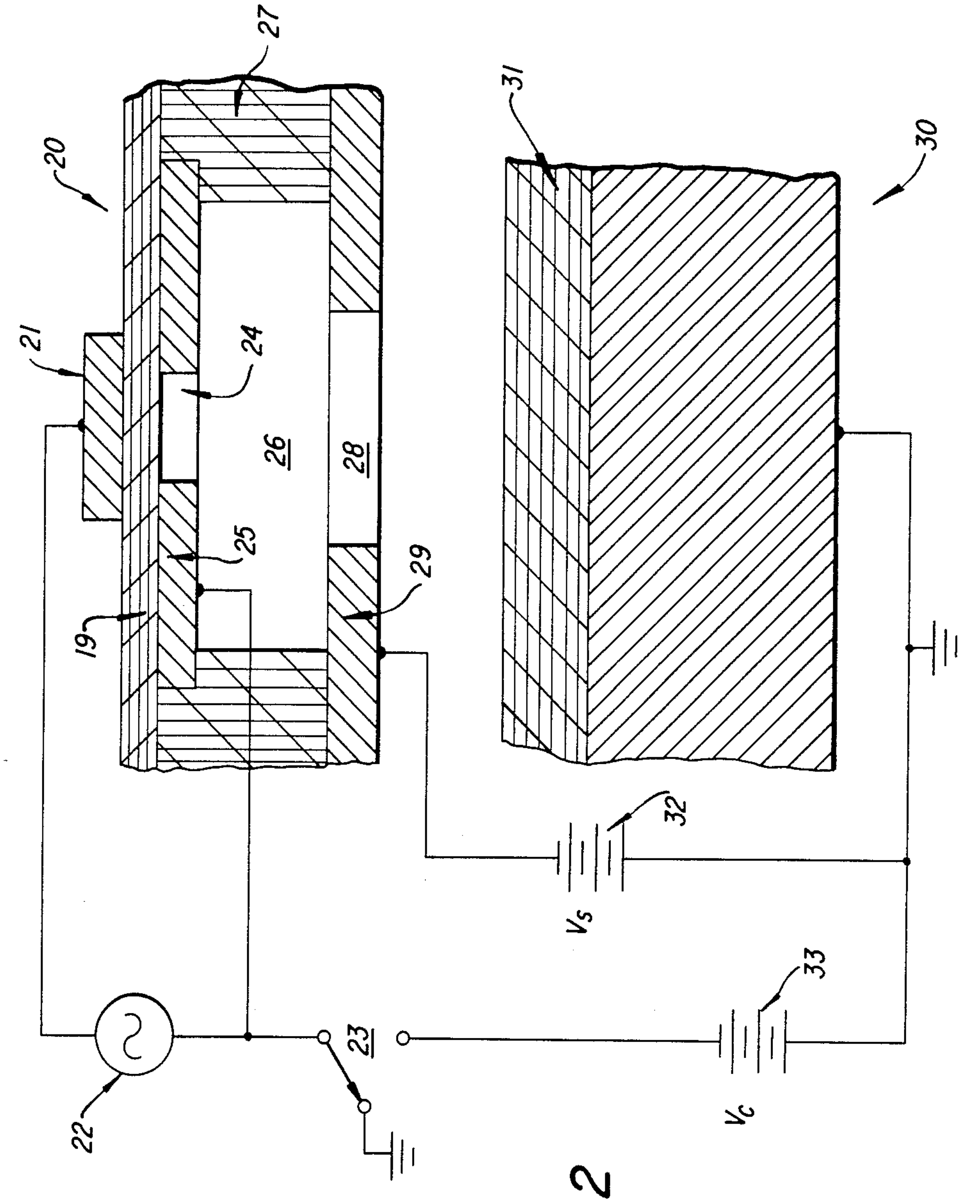
FIG. 2 is a schematic and sectional view of an ion generator in accordance with the invention.

Reference should be had to FIGS. 3–7 for a detailed description of the invention. The devices used to achieve a controlled image typically utilize an ion generator 20 shown in the sectional view of FIG. 2. The ion generator includes a first electrode 21 and a second electrode 25, separated by a dielectric layer 19. A source 22 of alternating potential between the first and second electrodes is used to generate ions by providing an air gap breakdown in aperture 24.

This device may also incorporate a third, screen electrode 29 which is separated from the second electrode by a second dielectric layer 27. The second dielectric layer 27 has an aperture 26 positioned under aperture 24 in the second electrode. The screen electrode 29 contains an aperture 28 which is at least partially positioned under apertures 24 and 26. When the circuit is closed at switch 23, a potential 33 is applied to the second electrode 25, and a potential 32 is applied to the screen electrode 29. This operates to extract ions generated at electrode aperture 24, and transport them through the screen electrode aperture 28 to the surface 31 of the dielectric member 30.

The application of the ion generator for electrographic printing uses an array with first and second electrodes configured in matrix form. To maximize print quality it is advantageous to maintain uniform size of images produced across this array of ion generators. The invention overcomes problems of non-uniformity by maintaining control over the image size or stroke width produced by each ion generator. For example, a reduction in the size or an increase in the voltage 32 of the screen aperture 28 causes a corresponding reduction of latent image size on the surface of dielectric member 31, without any compromise in image charge. Image size may thereby be controlled to compensate for any variation among ion generators in the array as to the distance between the discharge aperture of the generator and the point where the image is formed on the dielectric receptive surface 31.

Figure 3:
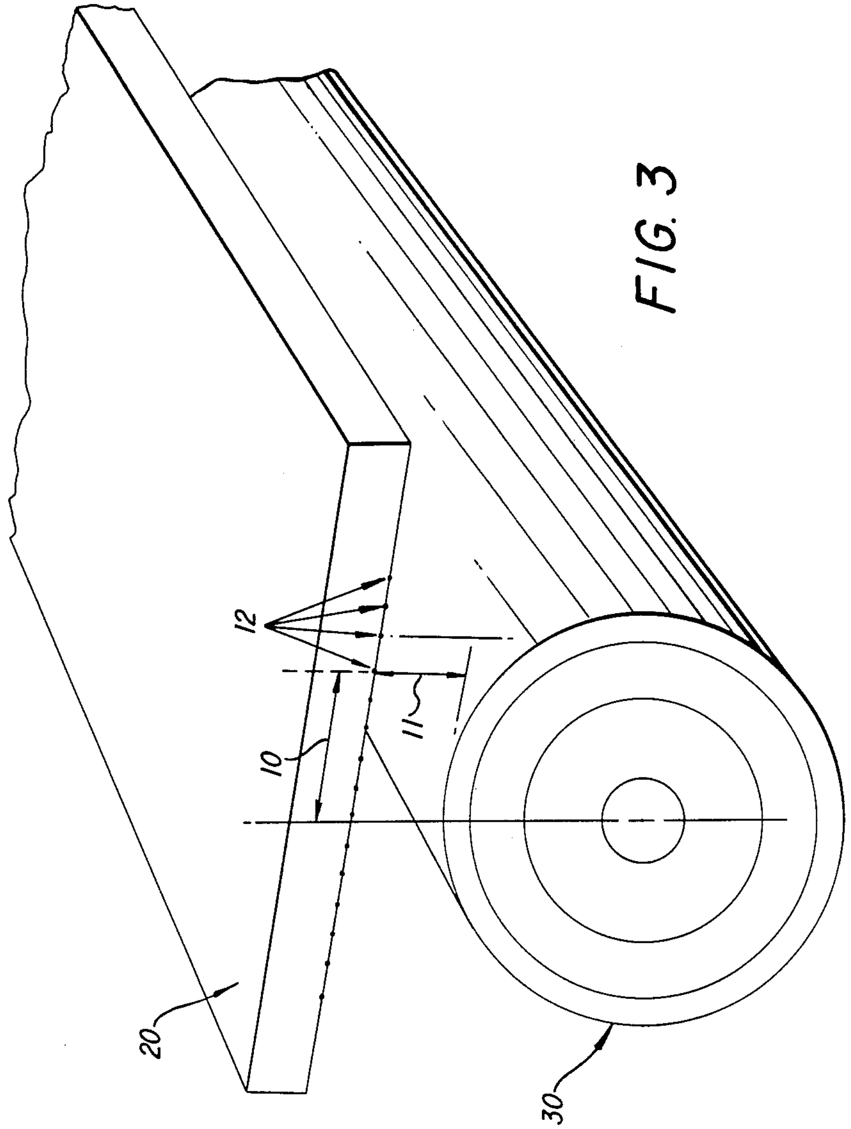
FIG. 3 is a perspective view showing the operating relationship between the cylinder and the cartridge.

The operating relationship of the cartridge 20 and the dielectric member 30, a cylinder in this case, is illustrated in FIG. 3. As the distance 10 from the center of the cartridge to each aperture 12 increases, the distance 11 from the electrode aperture to the dielectric cylinder increases. This variation of the distance 11 may result from the uneven shape of the dialectric receptive surface 31 and/or the reorientation of the cartridge 20 with respect to said dielectric surface. As the distance 11 increases, the size of the screen electrode aperture 24 may be increased to maintain uniform image size on the dielectric cylinder 30. The voltage 32 applied at the screen electrode aperture 24 may also be altered as the distance 11 varies so that the size of the electrostatic image can be controlled.

Figure 4A:
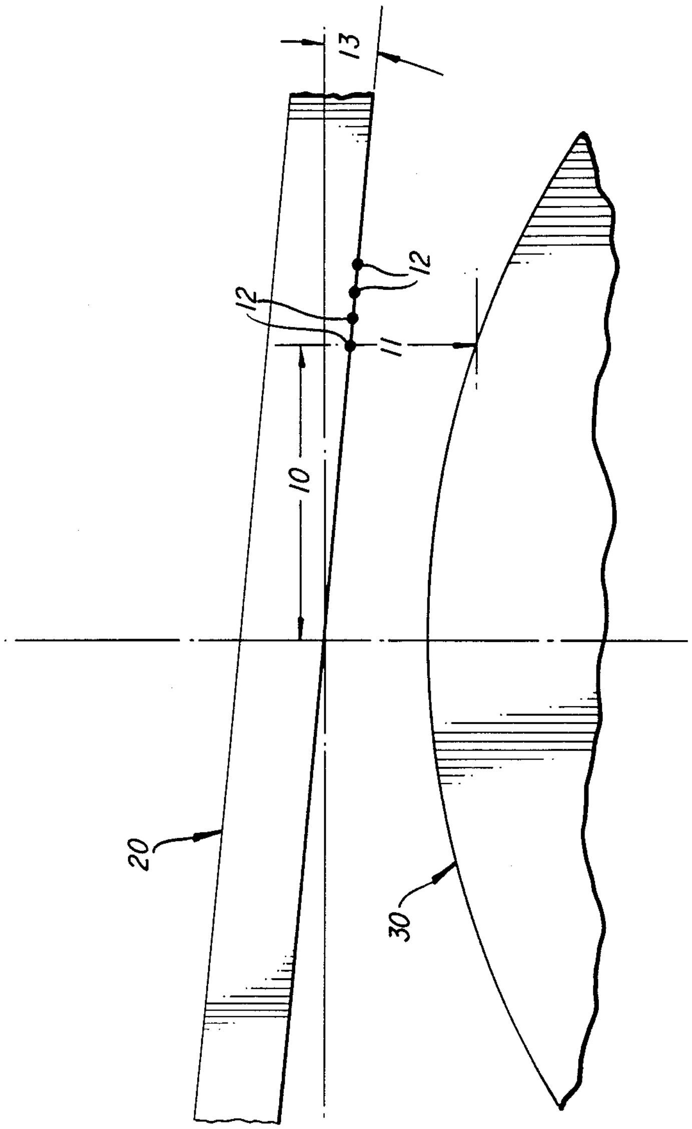
FIG. 4A is a sectional view illustrating cartridge tilt with respect to the cylinder.

When the cartridge 20 is tilted by an angle 13 with respect to the dielectric cylinder 30 as shown in FIG. 4A, this will cause an additional variation in the distance between the screen electrode and the cylinder, with resultant changes in electrostatic image size which may also be corrected by adjusting the size or voltage of individual apertures 28.

Figure 4B:
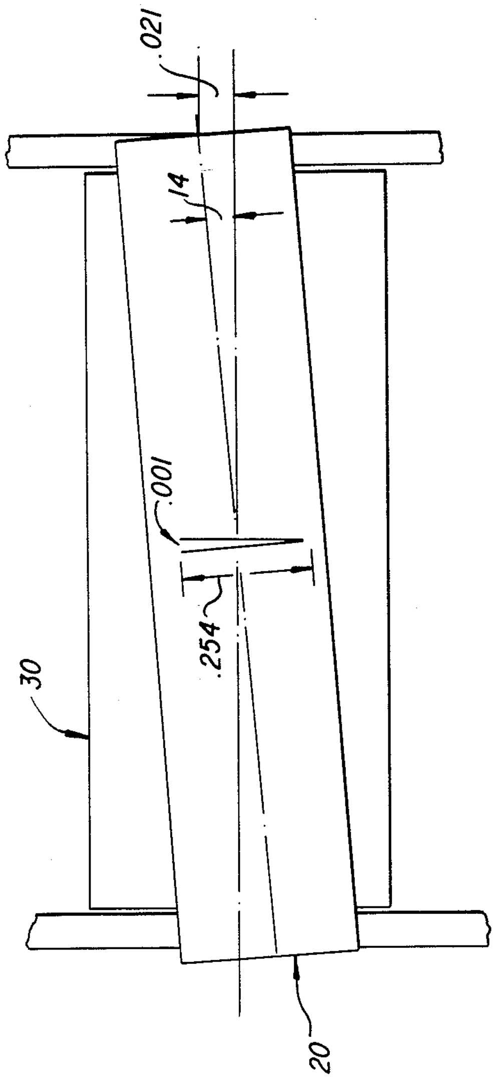
FIG. 4B is a sectional view illustrating cartridge skew with respect to the associated dielectric cylinder.

Similarly, when the cartridge 20 is skewed by an angle 14 with respect to the cylinder 30, as shown in FIG. 4B, the individual apertures may be adjusted to compensate for any variations in image size created by the associated changes in distance between each individual aperture and the position on the cylinder 30 where the corresponding electrostatic image is generated.

EXAMPLE 1

Figure 5A:
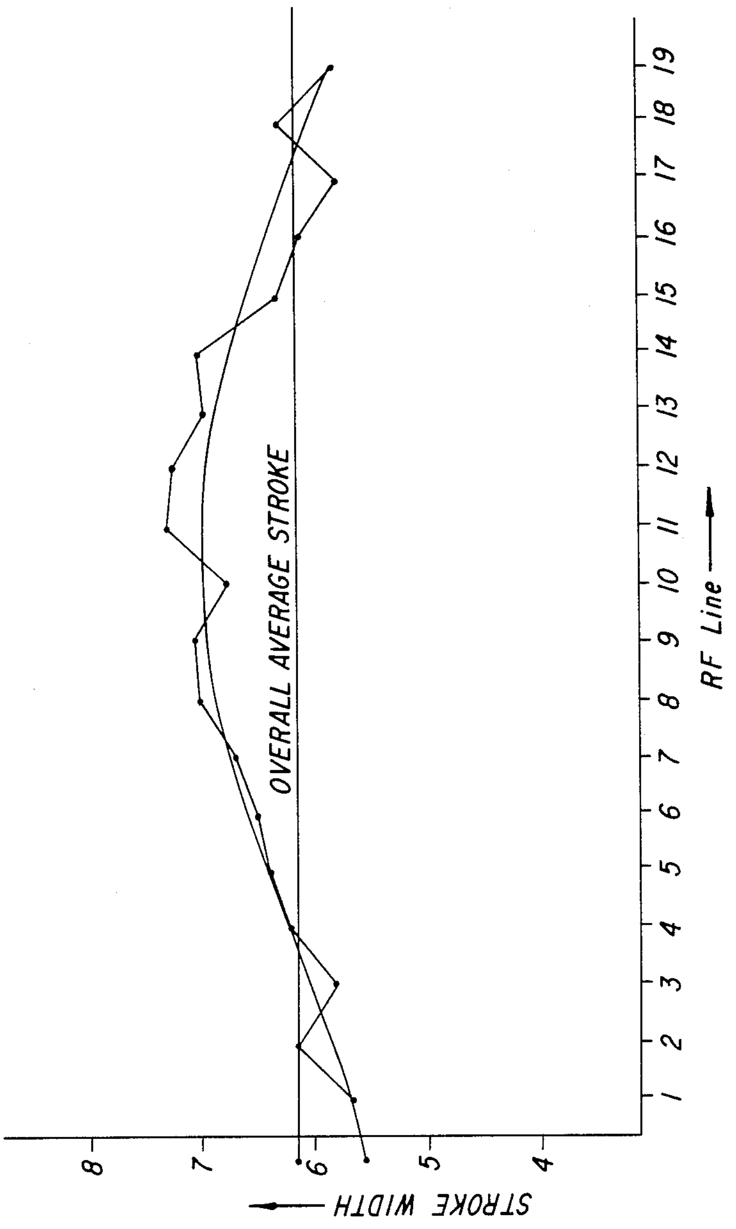
FIG. 5A is a plot of stroke width for an uncompensated cartridge.
Figure 5B:
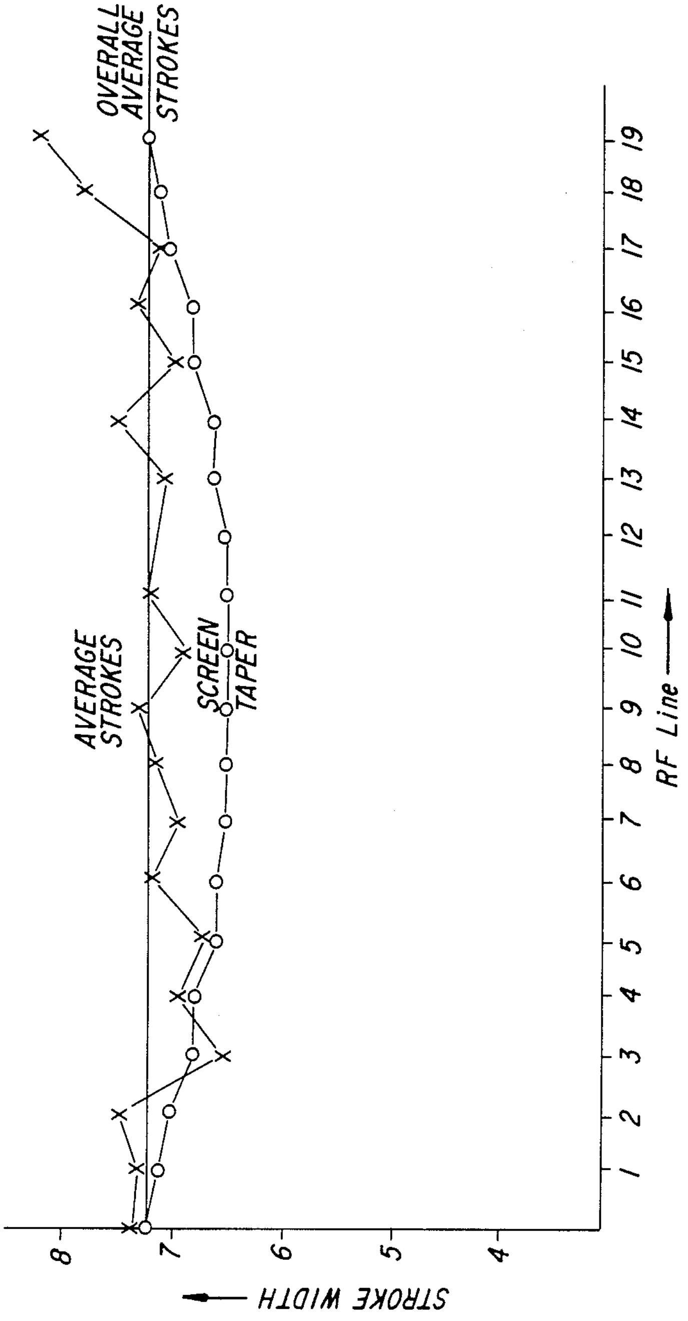
FIG. 5B is a plot of stroke width for a compensated cartridge.

A plot of the variation of stroke width as a function of the driver electrode position is shown in FIG. 5A, where the screen electrode has the same aperture size throughout. This plot demonstrates the typical variation in stroke width for an uncompensated screen electrode indicating larger stroke widths towards the middle of the cartridge where the distance between the cartridge and cylinder is shortest, and smaller stroke widths at the two sides of the cartridge where the distance from the cartridge to the cylinder has increased due to the curved surface of the cylinder. FIG. 5B illustrates how the screen aperture size may be tapered across the driver electrodes or "RF lines," of the cartridge so as to produce strokes of more uniform size.

EXAMPLE 2

Figure 6:
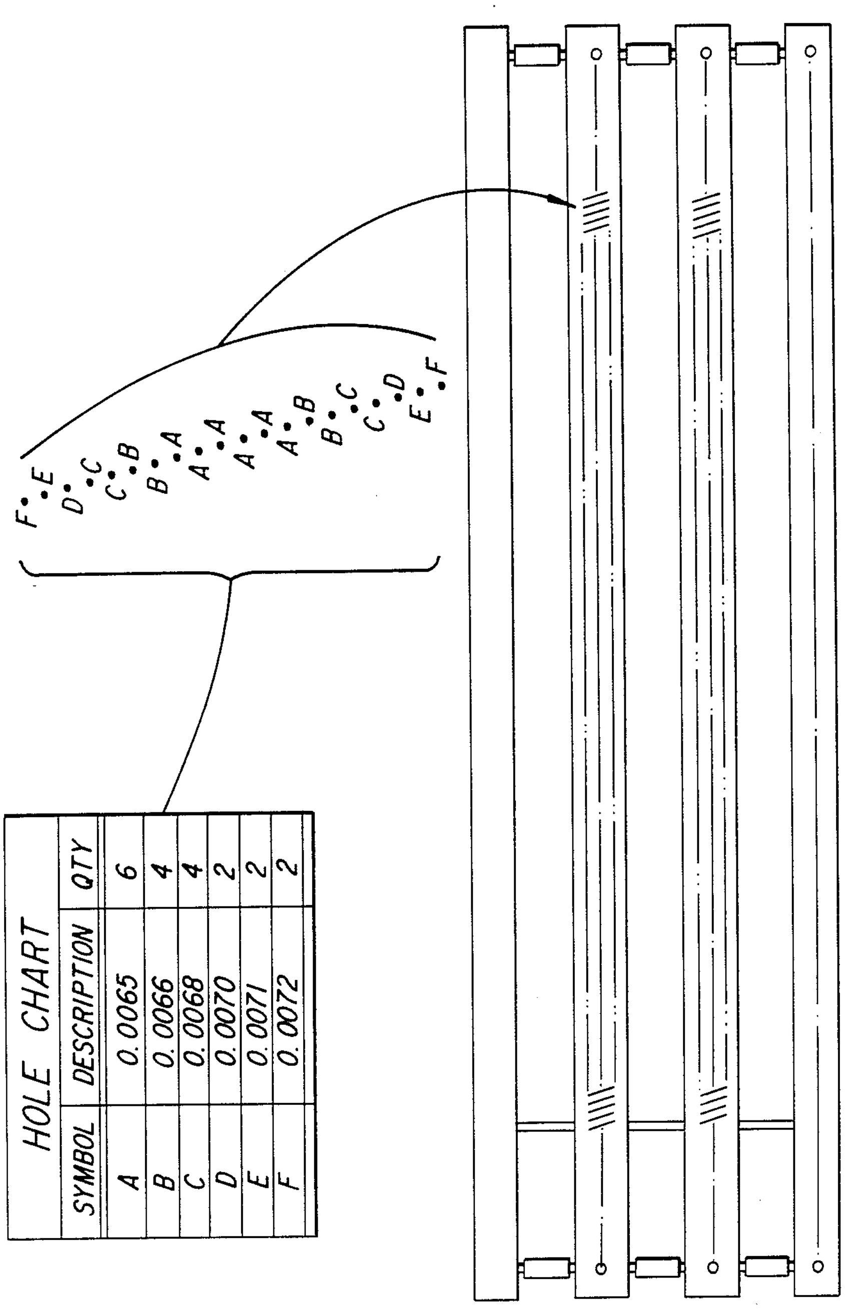
FIG. 6 is a screen electrode layout in accordance with the invention.

Illustrated in FIG. 6 is a screen electrode where the individual apertures in the screen electrode have been set at one of six listed diameters. Each skewed row of screen electrode apertures ranges from the smallest value of 0.0065 inches in the center, to 0.0072 inches at the two ends of the row. This taper of screen electrode aperture size results in a more uniform image size or stroke width.

EXAMPLE 3

Figure 7B:
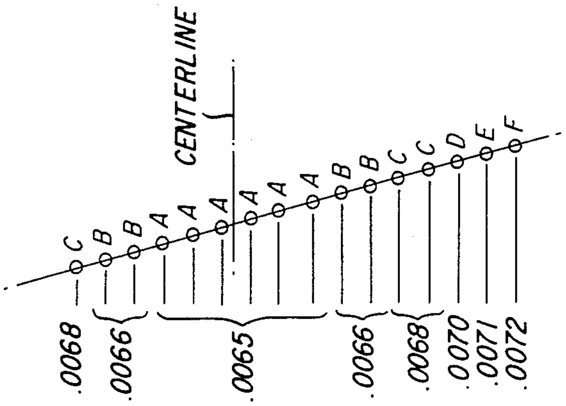
FIG. 7 is a comparison of a screen electrode layout with and without overhang.
Figure 7A:
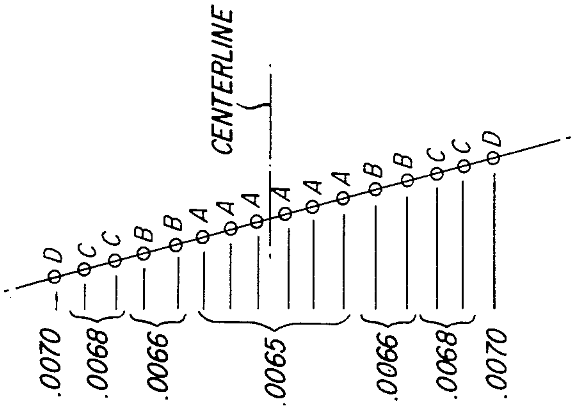

FIG. 7 shows the possible variation in screen aperture size where the cartridge has been skewed with respect to the cylinder as shown in FIG. 4B. In this case there are sixteen first or driver electrodes with associated screen electrode aperture sizes varying between 0.0065 inches at the center of the cartridge and 0.0070 inches at the outermost apertures. When the cartridge is skewed so that this line of driver electrodes is shifted by two apertures, the aperture size varies from 0.0068 inches at one end to 0.0065 inches at the center, to 0.0072 inches at the end where apertures are furthest from the dielectric cylinder.

EXAMPLE 4

Where the screen electrode aperture voltage is used to control stroke width in a non-skewed cartridge, the potential may be varied from Vc at the center to Ve at both ends of a row of apertures to compensate for the change in distance between the cartridge and a dielectric cylinder. Increasing the absolute value of the potential on the screen electrode decreases the image diameter.

I claim:

1. A method of generating compensated electrostatic images, which comprises the steps of:

applying a first time-varying potential between a first electrode adjacent a dielectric member and a second apertured electrode adjacent an opposite portion of said dielectric member to generate ions in the aperture, extracting generated ions by applying a second variable potential $V_c$ between the second electrode and a further electrode member and depositing said ions on a dielectric receptive surface, controlling the size of electrostatic images generated on the dielectric receptive surface.

2. The method of claim 1 further comprising the step of controlling the size of electrostatic images by providing a second electrode aperture of appropriate size.

3. The method of claim 1 further comprising the step of controlling the size of electrostatic images by providing a second electrode potential $v_c$ of appropriate magnitude and polarity.

4. The method of claim 1 further comprising the step of controlling the size of electrostatic images by providing an appropriate distance between the second electrode and said dielectric receptive surface.

5. The method of claim 1 of the type in which a multiplicity of first and second electrodes form cross points in an array configured such that the apertures of the second electrodes are located at the electrode crossover regions, wherein the extracting step is controlled by providing a multiplicity of third apertured electrodes which are separated from the second electrodes by an apertured dielectric member which lies between the second electrodes and the dielectric receptive surface, and by applying a potential $V_s$ between the third electrode and the further electrode member, wherein $V_s$ has a magnitude greater than or equal to zero and the same polarity as $V_C$.

6. The method of claim 5 further comprising the step of controlling the size of electrostatic images by providing third electrode apertures of appropriate size.

7. The method of claim 1 further comprising the step of controlling the size of electrostatic images by providing third electrode voltages Vs of appropriate magnitude and polarity.

8. The method of claim 5 further comprising the step of controlling the size of electrostatic images by providing an appropriate distance between each third electrode aperture and said dielectric receptive surface.

9. Electrostatic imaging apparatus comprising a plurality of ion generating aperture sources;

means for collecting the ions generated by said aperture sources to form individual electrostatic images each source producing an electrostatic image of different size; and means for compensating for size variations in said images.

10. Apparatus as defined in claim 9 wherein said aperture sources comprise means for generating electrostatic charge images, with a single charge produced by each aperture source.

11. Apparatus as defined in claim 10 wherein the compensating means comprises means for applying different prescribed voltages to different aperture sources to produce said uniform pattern of charges on said collecting means.

12. Apparatus as defined in claim 10 wherein the collecting means has an irregularly shaped surface and said aperture sources are disposed in a regular geometric surface which is spaced from said irregularly shaped surface.

13. Apparatus as defined in claim 12 wherein said collecting means is cylindrical and said regular surface is planar.

14. Apparatus as defined in claim 10 wherein the collecting means is cylindrical and said aperture sources have a non-planar surface.

15. Apparatus as defined in claim 14 wherein said non-planar surface containing said aperture sources is semi-cylindrical and uniformly spaced from said collecting means.

16. Apparatus as defined in claim 10 wherein the size of the aperture of said sources are increased or decreased in relation to the distance from the collecting means in order to achieve a uniform pattern of charges.

17. Apparatus as defined in claim 12 wherein said compensating means comprises means for producing charges of equal size by said aperture sources.

18. Apparatus as defined in claim 10 wherein the compensating means includes aperture sources of increased size to offset any increase in distance between said sources and the collecting means.

* * * * *